a corporation of New Jersey

3,029,506
SILICON-CONTAINING ALUMINUM COATED WELDING ELECTRODE AND METHOD OF PRODUCING THE SAME

Ronald E. Griffiths, Cleveland Heights, and Arch W. Harris, Warrensville Township, Cuyahoga County, Ohio, assignors to United States Steel Corporation, a corporation of New Jersey
No Drawing. Filed Jan. 11, 1955, Ser. No. 481,259
2 Claims. (Cl. 29—528)

This invention relates to improvements in the manufacture of welding electrodes.

One of the problems encountered in fusion welding wherein the electrode provides the source of deposited metal is porosity in the deposited metal which lowers the strength thereof. Since aluminum is a known deoxidizer, it has been proposed to add aluminum to the welding electrode but this renders ferrous metals incapable of being formed and drawn into wire of the desired size. We have discovered however, that predominately aluminum coatings, if applied in accordance with the teachings of our invention can be used to advantage in many types of welding.

In present day continuous welding machines, the electrode wire is continuously fed through a welding head wherein it makes a sliding electrical contact with a sleeve through which the welding current is applied to the wire. Thus the surface of the electrode must be smooth and abrasion resistant. Moreover, to be fully effective as an electrode, the aluminum coated wire must not only have a smooth surface, but the aluminum coating must be of uniform thickness.

It is accordingly an object of our invention to provide an improved welding electrode and method of producing the same.

In accordance with the teachings of our invention, wire to be coated is cleaned by conventional practice, such as heating in air or a lead pan to burn off any lubricants thereon and pickled in an acid solution to remove any oxide. It is thereafter quickly introduced into a reducing or nonoxidizing atmosphere wherein it is heated and then introduced in a bath of molten aluminum while still protected by such atmosphere. The wire is heated to at least 1150° F. and preferably to or slightly above the bath temperature. The bath contains up to about 12.5% silicon to render the bath more fluid and reduce the formation of the brittle intermetallic iron-aluminum alloy. At least 2% silicon is required for this purpose and preferably between 2 and 8% is used. The preferred amount is about 4%. The molten coating bath is maintained at a temperature between 1100° F. and 1300° F., preferably about 1250° F. and the time of immersion is regulated to produce a coating weighing less than .3 ounce per square foot and preferably between .10 and .22 ounce per square foot. The coated wire is withdrawn from the pot and the coating solidified thereon.

Following solidification, the coated wire is cold drawn through a reducing die at least enough to work the coating throughout. To achieve this result, the diameter of the coated wire must be reduced at least about 10% in cross-sectional area.

The wire forming the base metal may be any metal that it is desired to deposit. In most forms, it wil be ferrous metal of plain carbon, alloy or "stainless" grades. Nonferrous metals such as titanium, nickel, copper and alloys thereof may be coated. As in all fusion welding, the base metal used is designed to give a weld bead of similar characteristics to the metal joined together.

One commonly used grade of steel wire is made to the following specification:

| | Percent |
|---|---|
| Carbon | .07–.14 |
| Manganese | .75–1.05 |
| Phosphorus | max .025 |
| Sulphur | max .030 |
| Silicon | .3–.6 |

We have successfully coated $\frac{3}{32}''$ wire formed of a heat of such steel having the following analysis:

| | Percent |
|---|---|
| Carbon | .14 |
| Manganese | .99 |
| Phosphorus | .020 |
| Sulphur | .019 |
| Silicon | .37 |

The wire was cleaned by heating in air to burn off any volatile lubricants and then pickled in a 10% by weight hydrochloric acid solution to remove any oxide thereon. It was then rinsed thoroughly in hot water and introduced into a nonoxidizing atmosphere composed of dissociated ammonia wherein it was heated to 1250° F. Following this and while still protected by the atmosphere, it was introduced into a bath of molten aluminum containing 3% silicon, maintained at a temperature of 1250° F. and the time of immersion regulated to produce a coating weight of about .19 ounce per square foot of wire surface. Following solidification, the coated wire was cold drawn to reduce the cross-sectional area about 11% to work the coating throughout and produce a smooth uniform coated electrode.

Electrodes coated with aluminum as above, permit, in the case of ferrous base metal, higher amperage welding currents since aluminum is a better conductor than iron and thereby permits higher welding speeds. The aluminum produces more fluidity in the weld deposit and this along with its deoxidizing effect produces more uniform deposits with greater freedom from porosity, particularly in the so-called "automatic" types wherein the arc is shielded by gas or the metal is deposited under a blanket of flux.

While we have shown and described several specific embodiments of our invention, it will be understood that these embodiments are merely for the purpose of illustration and description and that various other forms may be devised within the scope of our invention, as defined in the appended claims.

We claim:

1. A method of producing a fusion welding electrode having a predominately aluminum coating thereon, comprising forming electrode stock of steel containing

| | Percent |
|---|---|
| Carbon | .07–.14 |
| Manganese | .75–1.05 |
| Maximum phosphorus | .025 |
| Maximum sulphur | .030 |
| Silicon | .3–.6 | and the balance substantially iron, comprising cleaning the electrode stock, heating said stock in a nonoxidizing atmosphere to at least about 1150° F., passing said stock through a bath of molten aluminum containing between 2 and 12.5% silicon, regulating the time of immersion of said stock in said bath to produce a coating thereon having a weight from .10 to .22 ounce per square foot of electrode stock, maintaining said bath at a temperature between 1100° F. and 1300° F., solidifying the coating thereon and then cold drawing the coated electrode an amount to reduce the diameter thereof at least about 10% to densify the coating thereon and reduce the electrode to the desired size.

2. A method of producing a fusion welding electrode having a predominately aluminum coating thereon, comprising forming electrode stock of steel containing

| | Percent |
|---|---|
| Carbon | .07–.14 |
| Manganese | .75–1.05 |
| Maximum phosphorus | .025 |
| Maximum sulphur | .030 |
| Silicon | .3–.6 | and the balance substantially iron, comprising cleaning the electrode stock, heating said stock in a nonoxidizing atmosphere to about 1250° F., passing said stock through a bath of molten aluminum containing between 2 and 12.5% silicon, maintaining said bath at a temperature of about 1250° F., regulating the time of immersion of said stock in said bath to produce a coating thereon having a weight from .10 to .22 ounce per square foot of electrode stock, solidifying the coating on said stock and then cold drawing the coated stock to densify the coating thereon and reduce it to the desired electrode size.

References Cited in the file of this patent

UNITED STATES PATENTS

| | | |
|---|---|---|
| 1,277,639 | Pescatore | Sept. 3, 1918 |
| 1,794,983 | Ritter | Mar. 3, 1931 |
| 2,319,977 | Cape et al. | May 25, 1943 |
| 2,543,936 | Reynolds | Mar. 6, 1951 |
| 2,686,355 | Lundin | Aug. 17, 1954 |